(12) United States Patent
Kim et al.

(10) Patent No.: US 10,770,714 B2
(45) Date of Patent: Sep. 8, 2020

(54) ELECTRODE MANUFACTURING METHOD FOR IMPROVING BATTERY CAPACITY AND ELECTRODE MANUFACTURED THEREBY

(71) Applicant: LG CHEM, LTD., Seoul (KR)

(72) Inventors: Tae-Su Kim, Daejeon (KR); Jin-Soo Lee, Daejeon (KR); Bu-Gon Shin, Daejeon (KR); Ki-Eun Sung, Daejeon (KR); Dae-Han Seo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 510 days.

(21) Appl. No.: 15/513,473

(22) PCT Filed: Oct. 26, 2015

(86) PCT No.: PCT/KR2015/011338
§ 371 (c)(1),
(2) Date: Mar. 22, 2017

(87) PCT Pub. No.: WO2016/064260
PCT Pub. Date: Apr. 28, 2016

(65) Prior Publication Data
US 2017/0309475 A1      Oct. 26, 2017

(30) Foreign Application Priority Data

Oct. 23, 2015   (KR) .................. 10-2015-0148277

(51) Int. Cl.
*H01M 4/04* (2006.01)
*H01M 4/139* (2010.01)
(Continued)

(52) U.S. Cl.
CPC ......... *H01M 4/0404* (2013.01); *H01M 4/139* (2013.01); *H01M 10/052* (2013.01);
(Continued)

(58) Field of Classification Search
CPC .................. H01M 2010/4292; H01M 4/0404
See application file for complete search history.

(56) References Cited

U.S. PATENT DOCUMENTS

2008/0026293 A1* 1/2008 Marple ............... H01M 4/5815
429/231.95
2009/0208671 A1* 8/2009 Nieh .................... C23C 14/025
427/596

(Continued)

FOREIGN PATENT DOCUMENTS

DE    10 2010 044 080 A1    5/2012
DE       102010044080 A1 *  5/2012  ............ H01M 4/139

(Continued)

OTHER PUBLICATIONS

Machine Translation of DE-10 2010 044 080-A1 dated May 24, 2012.

(Continued)

*Primary Examiner* — Maria Laios
(74) *Attorney, Agent, or Firm* — Birch, Stewart, Kolasch & Birch, LLP (57) ABSTRACT

The present invention relates to an electrode manufacturing method, an electrode manufactured thereby, and a battery comprising the same, the electrode manufacturing method comprising the steps of: applying an electrode active material onto a collector; and radiating a laser such that the end of an electrode active material layer, which has been obtained by applying the electrode active material, becomes straight, thereby removing the electrode active material.

The present invention is advantageous in that the difference in area between active materials applied to the positive and negative electrodes, respectively, is minimized, thereby increasing the capacity and improving the stability of the battery.

11 Claims, 12 Drawing Sheets

(51) Int. Cl.
  *H01M 10/42* (2006.01)
  *H01M 10/052* (2010.01)
  *B23K 26/356* (2014.01)
  *H01M 10/0525* (2010.01)

(52) U.S. Cl.
  CPC ....... *B23K 26/356* (2015.10); *H01M 10/0525* (2013.01); *H01M 2010/4292* (2013.01)

(56) References Cited

U.S. PATENT DOCUMENTS

| | | | |
|---|---|---|---|
| 2011/0123841 A1 | 5/2011 | Ahn et al. | |
| 2013/0252086 A1* | 9/2013 | Stern | H01M 2/26 429/209 |
| 2014/0007418 A1* | 1/2014 | Song | H01M 6/005 29/623.1 |
| 2014/0220233 A1* | 8/2014 | Huang | H01M 2/145 427/58 |
| 2017/0170456 A1* | 6/2017 | Zhang | B23K 26/352 |

FOREIGN PATENT DOCUMENTS

| | | |
|---|---|---|
| JP | 11-54106 A | 2/1999 |
| JP | 2000-149911 A | 5/2000 |
| KR | 10-2006-0010650 A | 2/2006 |
| KR | 10-2011-0058380 A | 6/2011 |
| KR | 10-1222218 B1 | 1/2013 |
| KR | 10-2013-0101174 A | 9/2013 |

OTHER PUBLICATIONS

European Search Report for Appl. No. 15852285.4 dated Aug. 28, 2017.

International Search Report for PCT/KR2015/011338 (PCT/ISA/210) dated Feb. 11, 2016.

\* cited by examiner

ELECTRODE MANUFACTURING METHOD FOR IMPROVING BATTERY CAPACITY AND ELECTRODE MANUFACTURED THEREBY

TECHNICAL FIELD

The present application claims the benefit of priority based on Korean Patent Application No. 10-2014-0145372 dated Oct. 24, 2014 and Korean Patent Application No. 10-2015-0148277 dated Oct. 23, 2015, and all the contents disclosed in the literatures of the corresponding Korea patent applications are included as a part of the present specification.

The present invention relates to an electrode manufacturing method for improving a battery capacity and an electrode manufactured thereby, and more particularly, to a method for manufacturing an electrode for improving a battery capacity, which improves the capacity of a battery by reducing a battery negative electrode overhang tolerance through a laser cleaning technology, and an electrode manufactured thereby.

BACKGROUND ART

Lithium ion batteries are an important element part of the times of mobile devices and electric cars, and the need for increasing the capacity is constantly raised. In general, a lithium polymer ion battery has a basic structure in which positive electrodes and negative electrodes are stacked while overlapping with each other, and a separation membrane is inserted between the positive electrode and the negative electrode in order to prevent a short-circuit of the electrode. At this time, in order to prevent precipitation of lithium of the battery, the area of the negative electrode has to be wide enough so as to cover that of the positive electrode, and refers to an overhang. Since the capacity of the battery is determined by an area in which the negative and positive electrodes overlap as described above, the difference in area between the negative electrode and the positive electrode has to be minimized in order to increase the capacity in the same battery size, and as a result, when the overhang can be reduced, the capacity of the battery within the same area may be increased.

However, when an active material is coated, there is a problem in that an electrode active material is linearly coated by a coating process, and accordingly, there is a problem in that the overhang tolerance of the positive electrode and the negative electrode is increased for the reason, and the problems bring negative effects on the safety and capacity of the battery. In order to minimize the problems, end portions have to be made straight when coated with an electrode active material, but as the coating thickness becomes large due to high capacity of the battery, it is now becoming difficult to make end portions straight.

In order to solve the problems, for example, Korean Patent Application Laid-Open No. 10-2006-0010650 suggests a method for manufacturing a secondary battery by removing an active material in an area exceeding a reference mass using any one of laser, press, scraper, or ultrasonic wave, but since the method does not minimize the difference in area between active materials applied to the negative and positive electrodes, i.e. an overhang, there is a limitation in improving the capacity of a battery.

DISCLOSURE

Technical Problem

The present invention has been made in an effort to solve the problems in the related art as described above, and an object thereof is to minimize an overhang tolerance by applying a laser process technology to remove the positive electrode and negative electrode active materials without any damage to electrode foil, thereby making the ends of a coating electrode active material straight.

Technical Solution

In order to accomplish the above object, the present provides a method for manufacturing an electrode, the method including the steps of:

applying an electrode active material onto a collector; and radiating a laser such that the end of an electrode active material layer, which has been obtained by applying the electrode active material, becomes straight, thereby removing the electrode active material.

In addition, the present invention provides an electrode manufactured by the electrode manufacturing method.

Furthermore, the present invention provides a battery including the electrode.

Advantageous Effects

By a method for improving the capacity of a battery according to the present invention, there is an advantage in that the difference in area between active materials applied to the positive and negative electrodes, i.e. an overhang is minimized, thereby increasing the capacity and improving the stability of the battery.

BEST MODE

Hereinafter, the present invention will be described in detail.

The electrode manufacturing method according to the present invention includes the steps of: applying an electrode active material onto a collector; and radiating a laser such that the end of an electrode active material layer, which has been obtained by applying the electrode active material, becomes straight, thereby removing the electrode active material.

First, the electrode manufacturing method of the present invention includes a step of: applying an electrode active material onto a collector.

The collector may be a collector for a positive electrode or a collector for a negative electrode, and the collector for a positive electrode and the collector for a negative electrode may be prepared by a typical method known in the art or a modified method thereof without particular limitation.

The collector for a positive electrode is not particularly limited as long as the collector has conductivity without causing a chemical change to the battery, and for example, it is possible to use stainless steel, aluminum, nickel, titanium, or fired carbon, or a material in which the surface of aluminum or stainless steel is surface-treated with carbon, nickel, titanium, silver, and the like. The collector may also increase the adhesive strength of a positive electrode active material by forming fine convex and concave irregularities on the surface thereof, and various forms such as a film, a sheet, a foil, a net, a porous body, a foaming body, and a nonwoven body can be employed. Further, the collector for a positive electrode may have a thickness of 3 to 500 μm.

The collector for a negative electrode is not particularly limited as long as the collector has conductivity without causing a chemical change to the battery, and for example, it is possible to use stainless steel, aluminum, nickel, titanium, or fired carbon, a material in which the surface of copper or stainless steel is surface-treated with carbon, nickel, titanium, silver, and the like, an aluminum-cadmium alloy, and the like. In addition, similarly to the positive electrode collector, the negative electrode collector may also increase the adhesive strength of a negative electrode active material by forming fine convex and concave irregularities on the surface thereof, and the collector may be used in various forms such as a film, a sheet, a foil, a net, a porous body, a foaming body, and a nonwoven body. Furthermore, the collector for a negative electrode may have a thickness of 3 to 500 μm.

The electrode active material may be a positive electrode active material or a negative electrode active material, the positive electrode active material or the negative electrode active material may be prepared by a typical method known in the art or a modified method thereof without particular limitation, and when the electrode active material is applied, the electrode active material may have a thickness of 50 to 200 μm.

The positive electrode active material includes, as a main ingredient, a layered compound such as lithium cobalt oxide ($LiCoO_2$) and lithium nickel oxide ($LiNiO_2$) or a compound substituted with one or more transition metals; a lithium manganese oxide ($LiMnO_2$) such as a chemical formula $Li_{1+x}Mn_{2-x}O_4$ (here, x is 0 to 0.33), $LiMnO_3$, $LiMn_2O_3$, and $LiMnO_2$; lithium copper oxide ($Li_2CuO_2$); a vanadium oxide such as $LiV_3O_8$, $LiFe_3O_4$, $V_2O_5$, and $Cu_2V_2O_7$; a nickel-site type lithium nickel oxide (lithiated nickel oxide) represented by a chemical formula $LiNi_{1-x}M_xO_2$ (here, M=Co, Mn, Al, Cu, Fe, Mg, B, or G, and x=0.01 to 0.3); a lithium manganese composite oxide represented by a chemical formula $LiMn_{2-x}M_xO_2$ (here, M=Co, Ni, Fe, Cr, Zn, or Ta, and x=0.01 to 0.1) or $Li_2Mn_3MO_8$ (here, M=Fe, Co, Ni, Cu, or Zn); $LiMn_2O_4$ in which a portion of lithium of the chemical formula is substituted with an alkaline earth metal ion; a disulfide compound; and a lithium intercalation material such as $Fe_2(MoO_4)_3$ or a composite oxide formed by a combination thereof, and examples of the positive electrode active material include those kinds described above, but are not limited thereto.

As the negative electrode active material, for example, it is possible to use: carbon such as hardly graphitizable carbon or graphite-based carbon; a metal composite oxide of $Li_xFe_2O_3$ ($0 \leq x \leq 1$), $Li_xWO_2$ ($0 \leq x \leq 1$), and $Sn_xMe_{1-x}Me'_yO_z$ (Me: Mn, Fe, Pb, Ge; Me': Al, B, P, Si, elements of Groups 1, 2, and 3 of the Periodic Table, halogen; $0 \leq x \leq 1$; $1 \leq y \leq 3$; and $1 \leq z \leq 8$); lithium metal; a lithium alloy; a silicon-based alloy; a tin-based alloy; an oxide such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; a conductive polymer such as polyacetylene; a Li—Co—Ni-based material, and the like.

Figure 1:
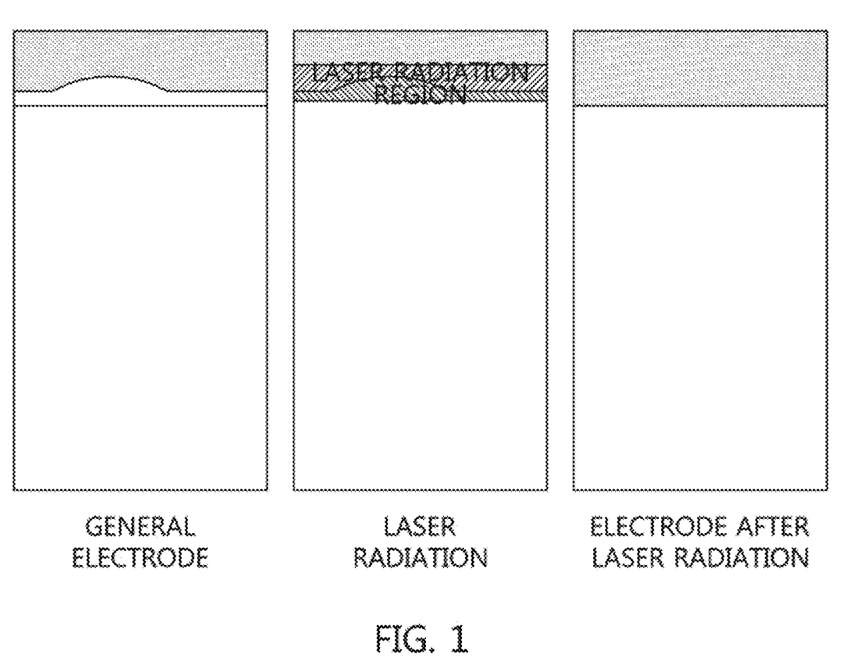
FIG. 1 is a schematic view illustrating a procedure of making the ends of an electrode active material of the electrode manufacturing method of the present invention straight.

The present invention may include a step of radiating a laser such that the end of an electrode active material layer, which has been obtained by applying the electrode active material, becomes straight, thereby removing the electrode active material, as illustrated in FIG. 1.

Figure 2:
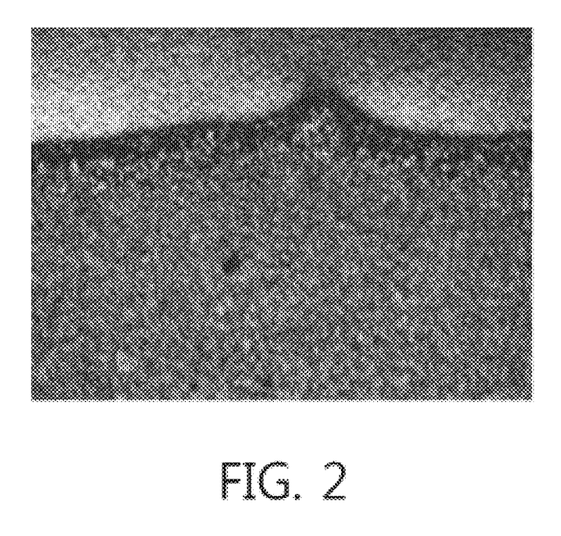
FIG. 2 is a photograph illustrating the aspect in which an electrode active material is coated on a collector in the electrode manufacturing method of the present invention.

When an electrode active material is coated on a collector, the coating of the electrode active material is not smoothly formed in a straight line, as illustrated in FIG. 2. When an electrode is formed by overlapping the negative and positive electrode in the state, a negative electrode active material may cover a positive electrode active material as illustrated at the left side of FIG. 4, but an overhang tolerance more than necessary occurs. The occurrence of the overhang tolerance may be substantially responsible for reducing the capacity of a battery, in that the capacity of the secondary battery is determined by an area in which the negative and positive electrodes overlap. However, when the coating of the electrode active material is smoothly formed in a straight line, the difference in area between the negative and positive electrodes may be minimized as illustrated at the right side of FIG. 4, and as a result, the capacity of the battery may be maximally increased within the same area because the overhang tolerance minimally occurs.

The present invention radiates a laser such that the end of an electrode active material layer, which has been obtained by applying the electrode active material, becomes straight.

In the present invention, the straight line refers to a concept of not only a straight line according to the mathematical definition, but also a straight line capable of being produced by light radiation in the laser industry, and is a concept including all of the slight aberrations which can be generally conceived in the industry.

In order to radiate a laser in accordance with the intention of the invention of the present invention, the absorbance of an active material and the reflectance of a lower electrode layer have to be considered, and copper or aluminum used as an electrode collector foil should not be damaged while easily removing the active material by adjusting laser radiation.

For this purpose, the laser radiation of the present invention uses a pulse laser, and preferably, a wavelength of the pulse laser may use a wavelength of 300 to 1,100 nm, and more preferably, a laser having a wavelength of 500 to 600 nm or 1,000 to 1,100 nm may be used.

Further, a pulse energy of the pulse laser may be used preferably as an energy of 0.05 to 5 mJ, more preferably as an energy of 0.1 to 3 mJ, and most preferably as an energy of 0.5 to 2 mJ. The reason that a pulse energy within the aforementioned range is used is because when the energy density at a portion on which the laser is focused is too low, an active mater may not be easily removed, and conversely, when the energy is too high, more than a region to be removed may be removed, thereby causing damage to the electrode.

Figure 5:
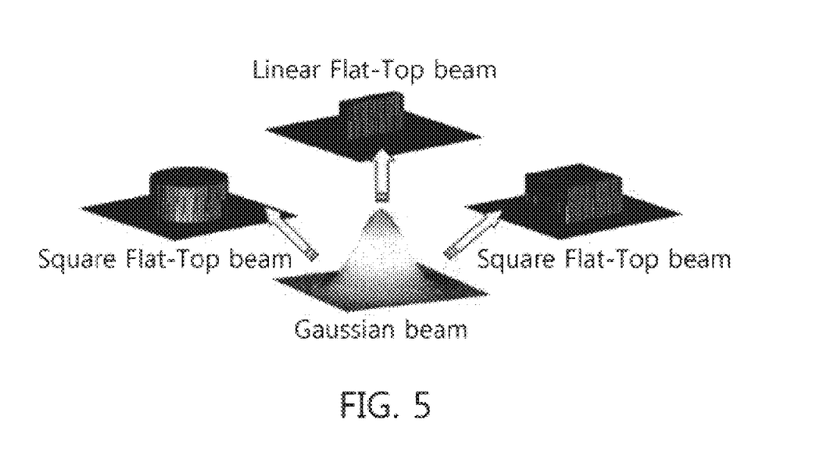
FIG. 5 is a view illustrating the shape of laser beam used when an active material layer is removed in the electrode manufacturing method of the present invention.

Further, in order to reduce the difference in removing the active material due to the difference in energy of the laser-exposed portion and minimize damage to a lower substrate, the shape of laser beam may be used by modifying laser beam from the Gaussian beam shape to the shape of circular flat-top beam, linear flat-top beam, or square flat-top beam, as illustrated in FIG. 5.

Figure 3:
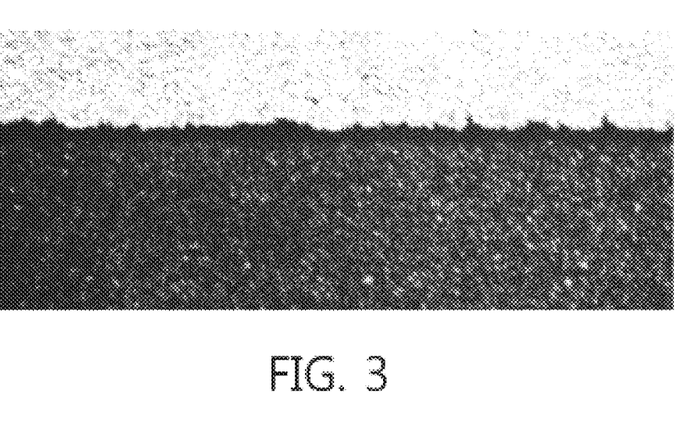
FIG. 3 is a photograph illustrating the aspect in which an electrode active material at the ends of an electrode active material layer has been removed by a laser in the electrode manufacturing method of the present invention.

When laser is radiated under the aforementioned conditions, the electrode active material can be relatively easily subjected to laser ablation as compared to the collector because the yield of laser light of an electrode active material is higher than that of, for example, aluminum (Al) or copper (Cu). When a laser having the energy under the same conditions is radiated onto an electrode active material through this, only the electrode active material may be removed, and as illustrated in FIG. 3, the electrode active material may be removed without causing damage to the collector, thereby increasing the straightness of the electrode active material coating shape at the ends of the electrode.

In addition, the present invention provides an electrode manufactured by the electrode manufacturing method.

As reviewed above, since the electrode manufactured by the present invention may minimize the difference in area between the negative and positive electrodes, and as a result, a minimal overhang tolerance occurs, the capacity of the battery within the same area may be maximally increased. The electrode manufactured by the present invention is more outstandingly improved than electrodes manufactured by the method in the related art.

Furthermore, the present invention provides a battery including the electrode.

The battery may be preferably a battery for a secondary battery, and more preferably a polymer battery for a secondary battery.

MODE FOR INVENTION

Although the present invention has been described with reference to the drawings according to the Examples of the present invention, various applications and modifications may be made by a person with ordinary skill in the art to which the present invention pertains within the scope of the present invention based on the aforementioned contents. The scope of the present invention is defined by the claims, and is intended to include any modification within the meaning and scope equivalent to the terms of the claims.

EXAMPLES

Preparation Examples

An active material was applied onto a copper collector foil having a size of 2 cm×2 cm, and then an electrode on which the active material was applied was prepared by drying the applied active material.

Example 1

Figure 4:
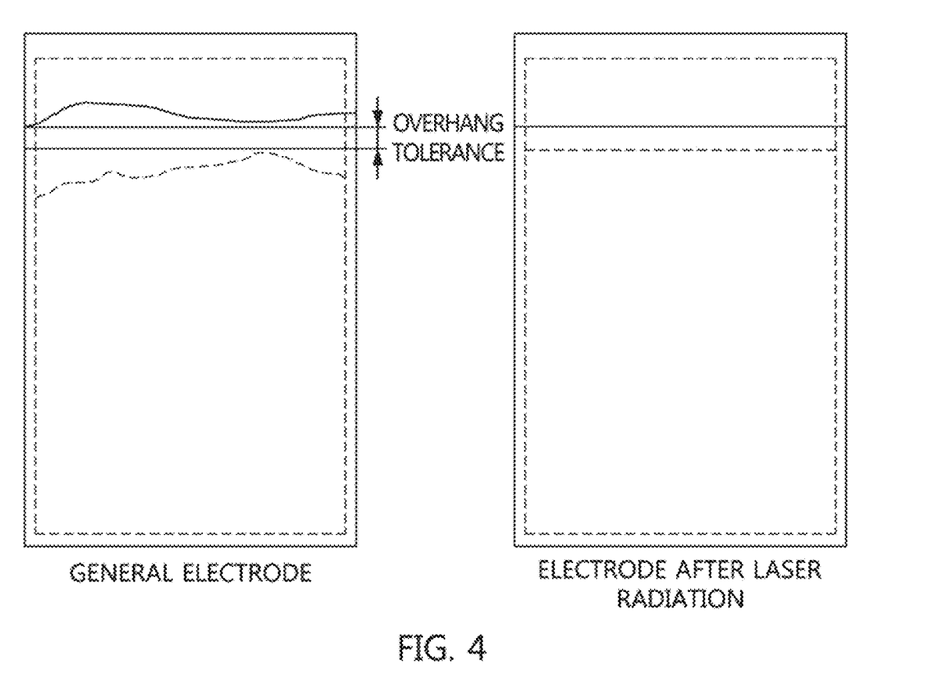
FIG. 4 is a view comparing the difference in overhang of a conventional electrode and an electrode manufactured in the present invention and the capacity of the battery according to the difference in overhang.

A fiber laser was radiated onto the electrode of the Preparation Example under laser conditions of a wavelength of 1,060 nm, a pulse width of 100 ns, a pulse energy of 1 mJ (20 W/20 kHz), and a laser moving speed of 1,000 mm/s, as illustrated in FIG. 4, thereby removing the active material. At this time, the experiment was carried out by changing the laser interval into 20 um, 30 um, and 40 um.

Example 2

A negative electrode was manufactured under the same conditions as in Example 1, except that the laser conditions were a wavelength of 1,060 nm, a pulse width of 50 ns, a pulse energy of 0.65 mJ (13 W/20 kHz), and a laser moving speed of 1,000 mm/s. At this time, the experiment was carried out by changing the laser interval into 20 um, 30 um, and 40 um.

Example 3

A negative electrode was manufactured under the same conditions as in Example 1, except that the laser conditions were a wavelength of 1,060 nm, a pulse width of 20 ns, a pulse energy of 0.35 mJ (7 W/20 kHz), and a laser moving speed of 1,000 mm/s. At this time, the experiment was carried out by changing the laser interval into 20 um, 30 um, and 40 um.

Example 4

A negative electrode was manufactured under the same conditions as in Example 1, except that the laser conditions were a wavelength of 1,060 nm, a pulse width of 10 ns, a pulse energy of 0.1 mJ (2 W/20 kHz), and a laser moving speed of 1,000 mm/s. At this time, the experiment was carried out by changing the laser interval into 20 um, 30 um, and 40 um.

Example 5

A negative electrode was manufactured under the same conditions as in Example 1, except that the laser conditions were a wavelength of 1,060 nm, a pulse width of 7 ns, a pulse energy of 0.05 mJ (1 W/20 kHz), and a laser moving speed of 1,000 mm/s. At this time, the experiment was carried out by changing the laser interval into 20 um, 30 um, and 40 um.

Example 6

A negative electrode was manufactured under the same conditions as in Example 1, except that the laser conditions were a wavelength of 1,060 nm, a pulse width of 7 ns, a pulse energy of 0.06 mJ (6 W/100 kHz), and a laser moving speed of 5,000 mm/s. At this time, the experiment was carried out by changing the laser interval into 20 um, 30 um, and 40 um.

Example 7

A negative electrode was manufactured under the same conditions as in Example 1, except that the laser conditions were a wavelength of 1,060 nm, a pulse width of 7 ns, a pulse energy of 0.15 mJ (20 W/300 kHz), and a laser moving speed of 5,000 mm/s. At this time, the experiment was carried out by changing the laser interval into 20 um, 30 um, and 40 um.

Experimental Examples

For the electrode from which the active material was removed in Examples 1 to 7, the surfaces were captured by using an optical microscope (Olympus BX51, Olympus Optical Co., Ltd.), and the images of the captured surfaces are shown in FIGS. 6 to 12, respectively in the order of Examples 1 to 7.

Figure 6:
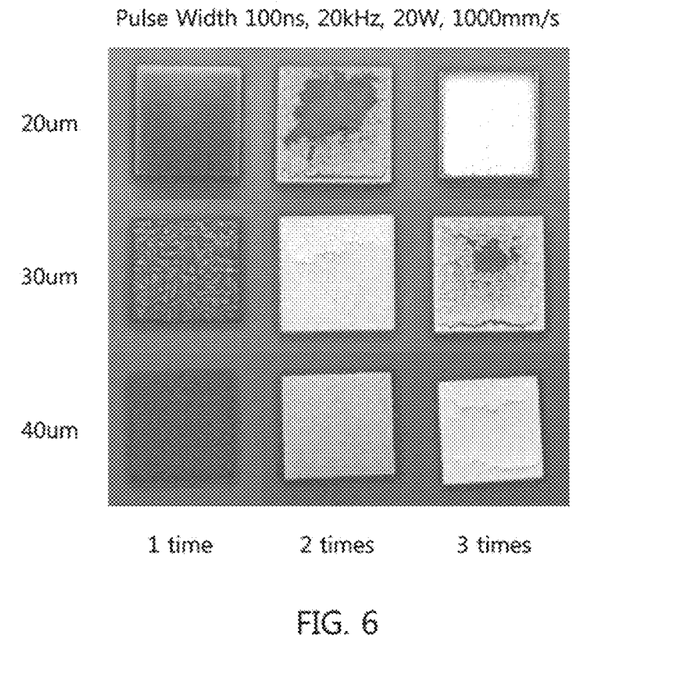
FIG. 6 is a photograph capturing the aspect in which the active material layer is removed according to Example 1 of the present invention.

In the case of Example 1, it could be confirmed that as the interval was changed into 20 um, 30 um, and 40 um, the active materials had been completely removed within the repeating number of 3 times, as illustrated in FIG. 6.

Figure 7:
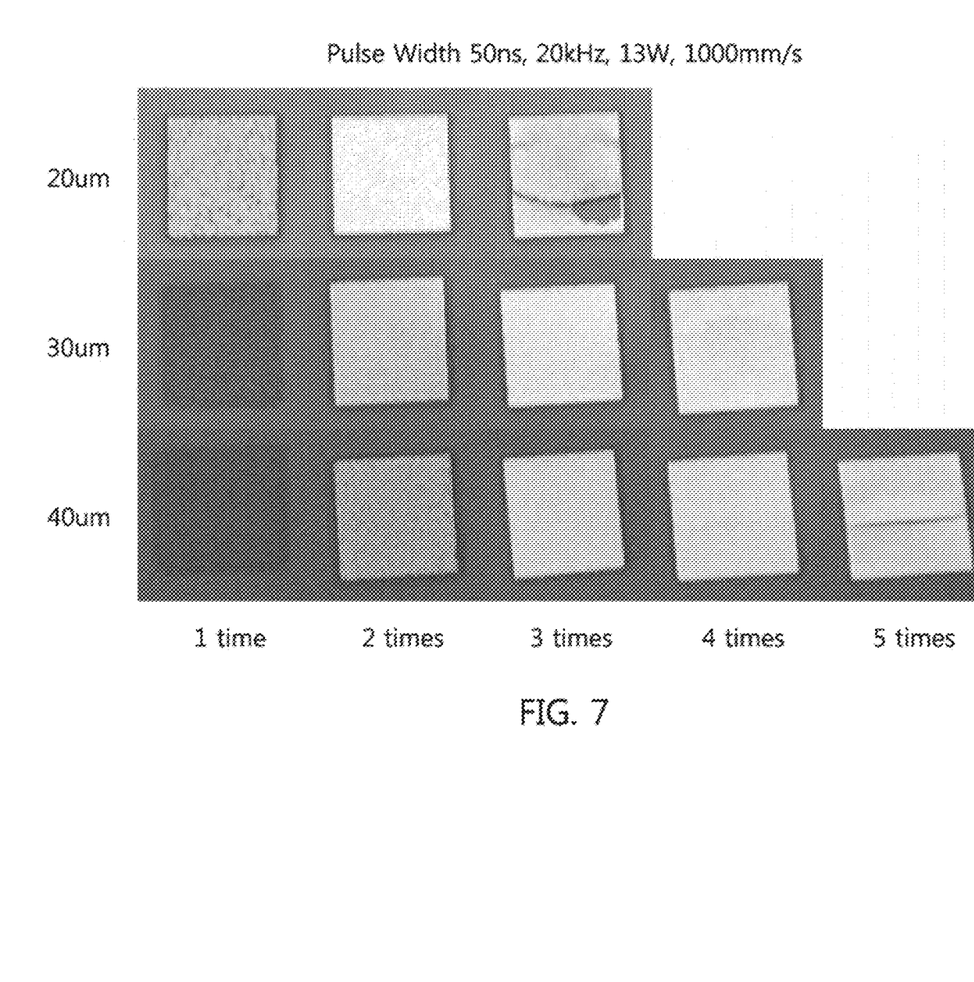
FIG. 7 is a photograph capturing the aspect in which the active material layer is removed according to Example 2 of the present invention.

In the case of Example 2, it could be confirmed that as the experiment was repeated three times at 20 um, four times at 30 um, and five times at 40 um, the active materials had been completely removed, as illustrated in FIG. 7.

Figure 8:
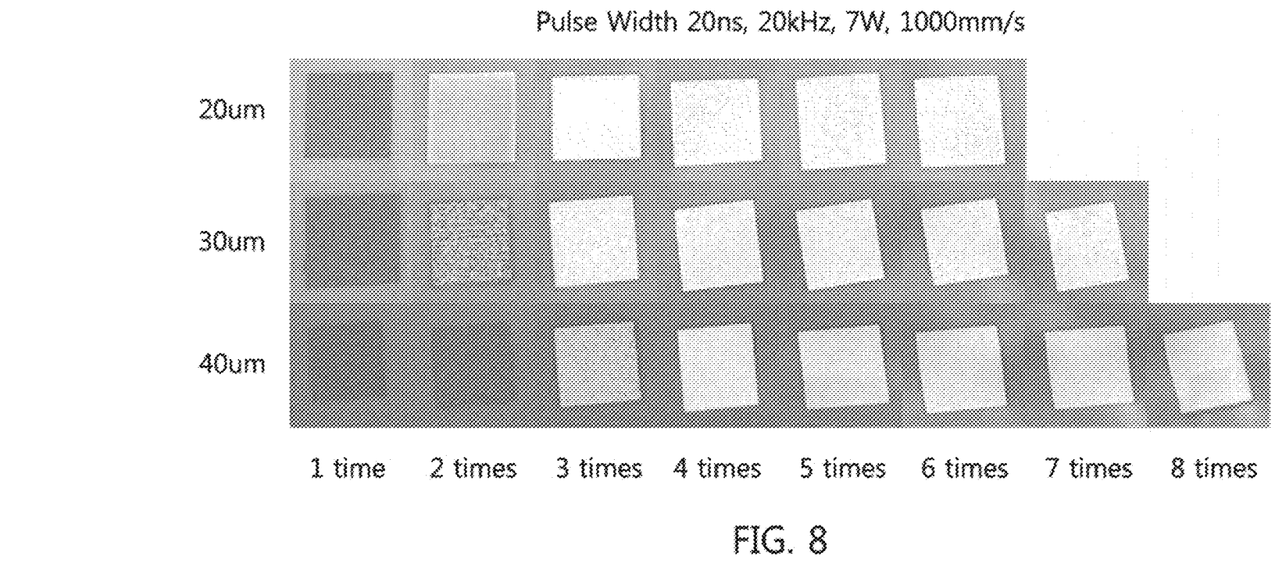
FIG. 8 is a photograph capturing the aspect in which the active material layer is removed according to Example 3 of the present invention.

In the case of Example 3, it could be confirmed that as the experiment was repeated six times at 20 um, seven times at 30 um, and eight times at 40 um, the active materials had been completely removed, as illustrated in FIG. 8.

Figure 9:
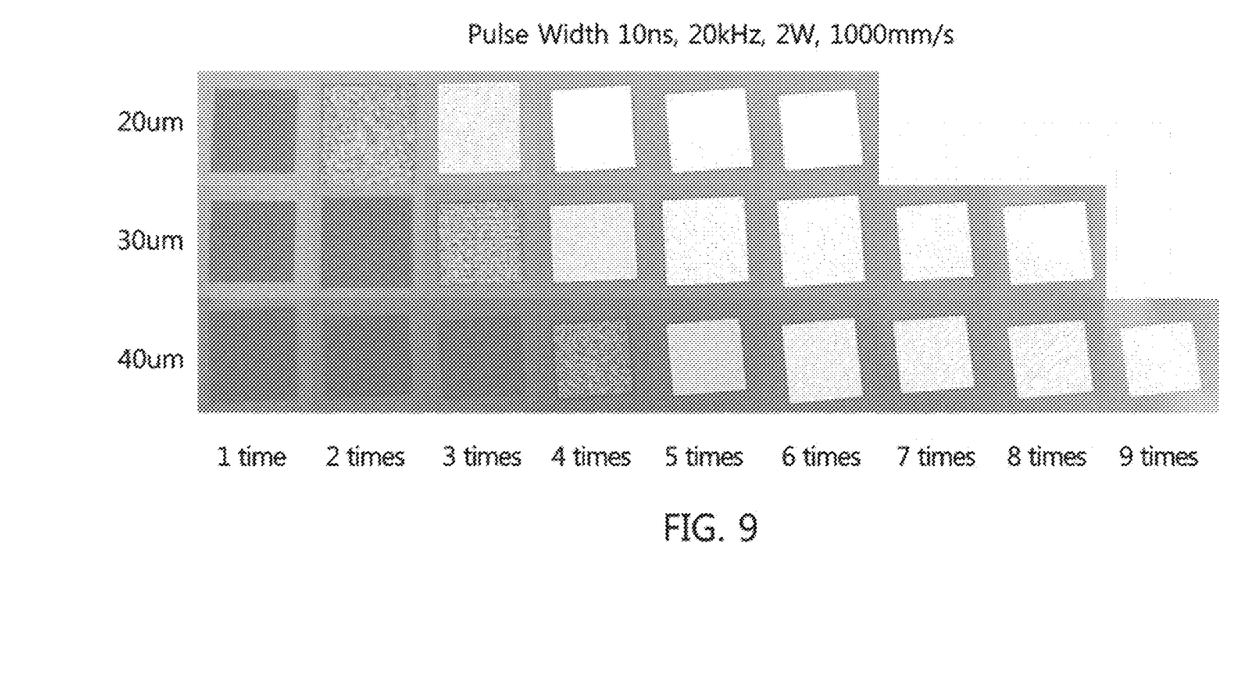
FIG. 9 is a photograph capturing the aspect in which the active material layer is removed according to Example 4 of the present invention.

In the case of Example 4, it could be confirmed that as the experiment was repeated six times at 20 um, eight times at 30 um, and nine times at 40 um, the active materials had been completely removed, as illustrated in FIG. 9.

Figure 10:
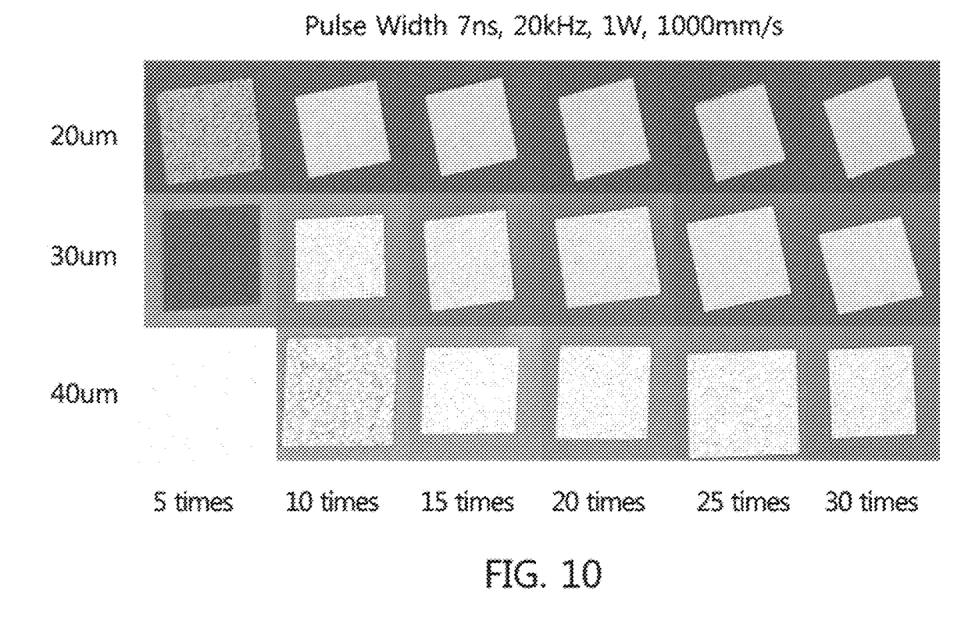
FIG. 10 is a photograph capturing the aspect in which the active material layer is removed according to Example 5 of the present invention.

In the case of Example 5, it could be confirmed that as the interval was changed into 20 um, 30 um, and 40 um, the active materials had been completely removed only when the experiment was repeated 30 times or more, as illustrated in FIG. 10.

Figure 11:
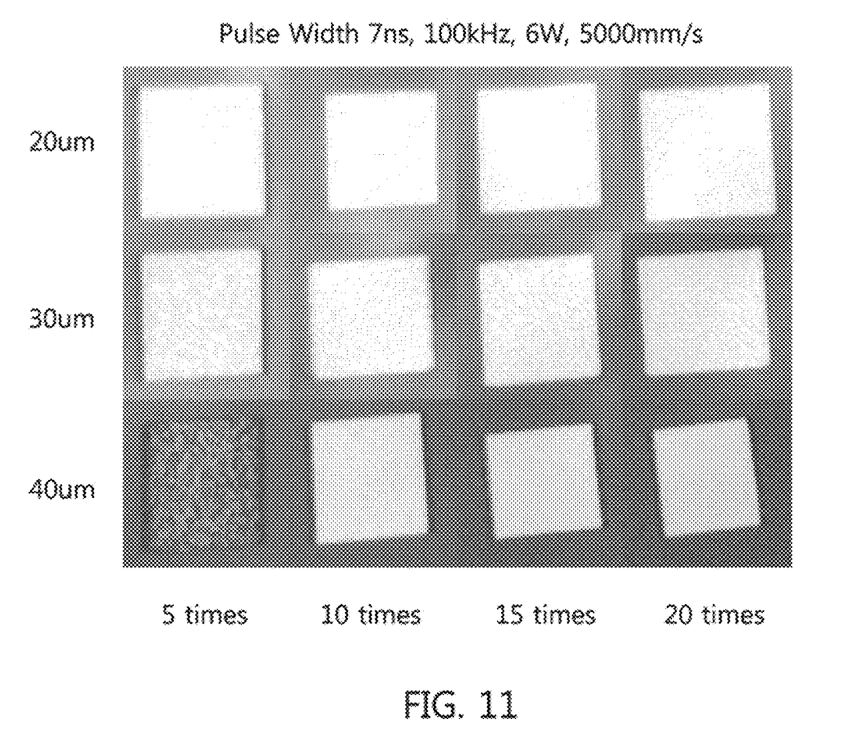
FIG. 11 is a photograph capturing the aspect in which the active material layer is removed according to Example 6 of the present invention.

In the case of Example 6, it could be confirmed that as the interval was changed into 20 um, 30 um, and 40 um, the active materials had been completely removed only when the experiment was repeated 20 times or more, as illustrated in FIG. 11.

Figure 12:
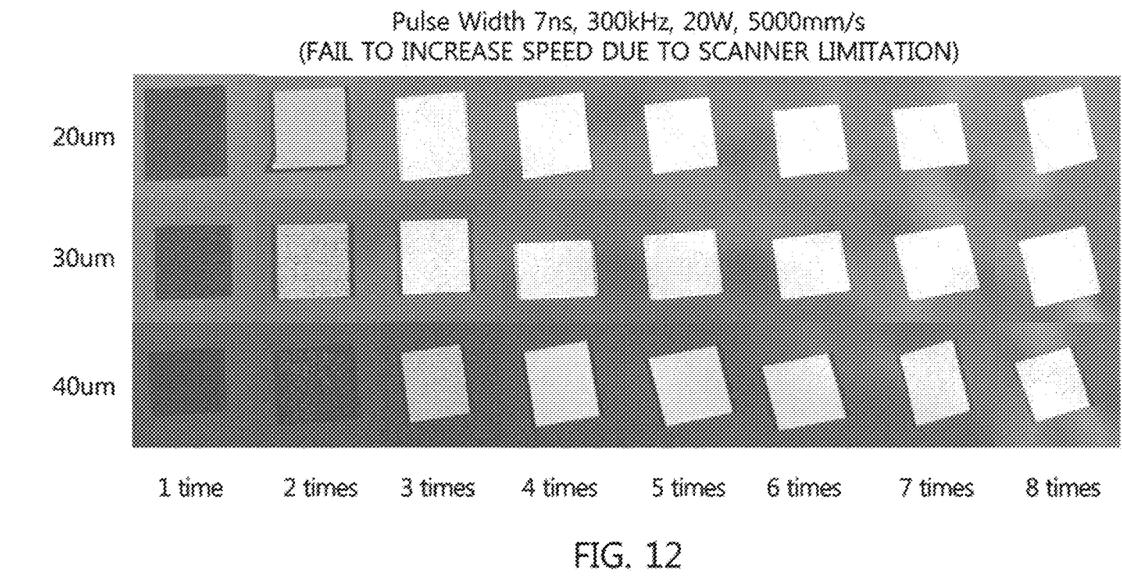
FIG. 12 is a photograph capturing the aspect in which the active material layer is removed according to Example 7 of the present invention.

In the case of Example 7, it could be confirmed that as the interval was changed into 20 um, 30 um, and 40 um, the active materials had been completely removed only when the experiment was repeated 8 times or more, as illustrated in FIG. 12.

The invention claimed is:

1. A method for manufacturing an electrode, the method comprising the steps of:
    forming a collector having a first side edge, a second side edge, a bottom edge and a top edge;
    applying a coating of an electrode active material onto the collector, the coating extending from the bottom edge of the collector to an upper edge spaced from the top edge of the collector; and
    radiating a laser onto an area of the coating such that the end of an electrode active material layer, which has been obtained by applying the electrode active material, becomes straight, thereby removing the electrode active material, the area having a straight bottom edge located between the bottom edge of the collector and the upper edge of the coating.

2. The method of claim 1, wherein the laser is a pulse laser.

3. The method of claim 2, wherein the pulse laser has a wavelength of 300 to 1,100 nm.

4. The method of claim 3, wherein the pulse laser has a wavelength of 500 to 600 nm.

5. The method of claim 3, wherein the pulse laser has a wavelength of 1,000 to 1,100 nm.

6. The method of claim 2, wherein the pulse laser has a pulse energy of 0.05 to 5 mJ.

7. The method of claim 6, wherein the pulse laser has a pulse energy of 0.1 to 3 mJ.

8. The method of claim 6, wherein the pulse laser has a pulse energy of 0.5 to 2 mJ.

9. The method of claim 2, wherein a beam shape of the pulse laser is a shape of circular flat-top beam, linear flat-top beam, or square flat-top beam.

10. The method of claim 1, wherein the collector is a collector for a positive electrode, and the electrode active material is a positive electrode active material.

11. The method of claim 1, wherein the collector is a collector for a negative electrode, and the electrode active material is a negative electrode active material.

* * * * *